(12) United States Patent
Fitzgibbon (10) Patent No.: US 8,175,591 B2
(45) Date of Patent: May 8, 2012

(54) BARRIER OPERATOR SYSTEM AND METHOD USING WIRELESS TRANSMISSION DEVICES

(75) Inventor: James J. Fitzgibbon, Batavia, IL (US)

(73) Assignee: The Chamerlain Group, Inc., Elmhurst, IL (US)

( * ) Notice: Subject to any disclaimer, the term of this patent is extended or adjusted under 35 U.S.C. 154(b) by 268 days.

(21) Appl. No.: 11/566,532

(22) Filed: Dec. 4, 2006

(65) Prior Publication Data
US 2008/0132220 A1    Jun. 5, 2008

(51) Int. Cl.
| | |
|---|---|
| H04M 3/00 | (2006.01) |
| H04M 3/42 | (2006.01) |
| H04M 1/64 | (2006.01) |
| H04B 7/00 | (2006.01) |
| G10L 11/00 | (2006.01) |
| G05B 19/00 | (2006.01) |
| H04R 1/10 | (2006.01) |

(52) U.S. Cl. ............ 455/420; 455/414.1; 455/41.2; 704/270; 704/275; 340/5.7; 379/67.1; 381/74

(58) Field of Classification Search ............... 455/469.1, 455/569.1, 420, 414.1; 704/270
See application file for complete search history.

(56) References Cited

U.S. PATENT DOCUMENTS

| | | | |
|---|---|---|---|
| 2,980,827 A | 4/1961 | Hill, III | |
| 3,536,836 A | 10/1970 | Pfeiffer | |
| 4,987,402 A | 1/1991 | Nykerk | |
| 5,003,293 A | 3/1991 | Wu | |
| 5,255,341 A | 10/1993 | Nakajima | |
| 5,280,527 A | 1/1994 | Gullman et al. | |
| 5,283,549 A | 2/1994 | Mehaffey et al. | |
| 6,161,005 A | 12/2000 | Pinzon | |
| 6,356,868 B1 | 3/2002 | Yuschik et al. | |
| 6,792,083 B2 | 9/2004 | Dams et al. | |

(Continued)

FOREIGN PATENT DOCUMENTS

DE    198 01 119 C1    9/1999

(Continued)

OTHER PUBLICATIONS

European Search Report—EP 1 280 109 A3.
Sensory, Inc. RSC-300/364 Data Book, Jan. 2001 (55 pages).
James Y. Wilson and Jason A. Kronz; Inside Bluetooth Part II, Dr. Dobb's Portal; The World of Software Development; Dr.Dobb's Journal; Jul. 22, 2001; 9 pages.

*Primary Examiner* — Dwayne Bost
*Assistant Examiner* — Timothy Pham
(74) *Attorney, Agent, or Firm* — Fitch Even Tabin & Flannery LLP (57) ABSTRACT

A system includes a wireless speech transmission device that communicates a wireless transmission of speech representing data in a first protocol via a wireless network. The speech representing data conveys substantially noise-free human speech. A wireless speech communication device receives the speech representing data in the first protocol via the network and couples representations of the data to a speech communication apparatus in a second protocol. A moveable barrier operator is within receiving range of the wireless transmission of the data from the wireless speech transmission device, intercepts the wireless transmission from the wireless speech transmission device, and recognizes a speech pattern from the data in the wireless transmission. A barrier movement apparatus actuates the barrier based upon the speech pattern.

29 Claims, 4 Drawing Sheets

U.S. PATENT DOCUMENTS

| | | | |
|---|---|---|---|
| 2003/0018478 A1* | 1/2003 | Mays | 704/275 |
| 2003/0023881 A1 | 1/2003 | Fitzgibbon et al. | |
| 2003/0182132 A1* | 9/2003 | Niemoeller | 704/275 |
| 2005/0170777 A1* | 8/2005 | Harwood et al. | 455/41.2 |
| 2006/0147052 A1* | 7/2006 | Wikel et al. | 381/74 |
| 2007/0116194 A1* | 5/2007 | Agapi et al. | 379/67.1 |
| 2008/0106370 A1* | 5/2008 | Perez et al. | 340/5.7 |

FOREIGN PATENT DOCUMENTS

| | | |
|---|---|---|
| EP | 0 913 979 A2 | 5/1999 |
| WO | WO 95/15663 | 6/1995 |
| WO | WO 99/23614 | 5/1999 |

* cited by examiner

BARRIER OPERATOR SYSTEM AND METHOD USING WIRELESS TRANSMISSION DEVICES

FIELD OF THE INVENTION

The field of the invention relates to barrier operator systems and, more specifically, to wireless communications used within these systems.

BACKGROUND

Different types of moveable barrier operators have been sold over the years and these barrier operator systems have been used to actuate various types of moveable barriers. For example, garage door operators have been used to move garage doors and gate operators have been used to open and close gates.

Such barrier movement operators may include various mechanisms to open and close the barrier. For instance, a wall control unit may be coupled to the barrier movement operator and send signals to a head unit thereby causing the head unit to open and close the barrier. In addition, operators often include a receiver unit at the head unit to receive wireless transmissions from a hand-held code transmitter or from a keypad transmitter, which may be affixed to the outside of the area closed by the barrier or other structure.

In some barrier operator systems, voice transmissions are received and used by the barrier operator to actuate the barrier. Unfortunately, in these previous barrier operator systems, the quality of the voice transmission received by the barrier operator was frequently inadequate for the barrier operator to properly determine a message in the transmission. For instance, large amounts of noise may be present in the voice transmission rendering the transmission unusable by the barrier operator. Consequently, because of the poor quality of the received transmissions, the moveable barrier operator was often unable to recognize the command or recognized the wrong command.

SUMMARY

Approaches are provided whereby a barrier operator intercepts high-quality speech transmissions and actuates a barrier based upon these high-quality voice transmissions. These approaches are easy to use, require minimal modifications to existing equipment, and allow barriers to be actuated as intended by system users.

As disclosed herein, a wireless speech transmission device communicates a wireless transmission of speech representing data in a first protocol via a wireless low-power personal area network. The speech representing data conveys substantially noise-free human speech. A wireless speech communication device receives the speech representing data in the first protocol via the wireless low-power personal area network and couples representations of the speech representing data to a speech communication apparatus in a second protocol. A moveable barrier operator is within receiving range of the wireless transmission of the speech representing data from the wireless speech transmission device, intercepts the wireless transmission from the wireless speech transmission device, and recognizes a speech pattern from the speech representing data in the wireless transmission. A barrier movement apparatus actuates the barrier based upon the speech pattern.

The moveable barrier operator may be configured to identify a word or phrase in the wireless transmission. For example, the word or phrase may relate to opening or closing the barrier. In other examples, the moveable barrier operator may determined if the user is authorized to actuate the barrier.

In one advantageous approach, the first protocol may be a Bluetooth-compliant protocol. In another approach, the second protocol may be a wired or wireless protocol. For example, the second protocol may be a cellular telephone protocol.

Different types of communication devices may be used in the system. For example, the wireless speech communication device may be a cellular phone. In other approaches, the wireless speech communication device may be a personal digital assistant, a pager, or a personal computer. In another example, the wireless transmission device may be a wireless headset.

The personal area network may be any network that operates and is able to communicate speech communications over a limited geographic area. For example, the personal area network may be a low power pico network that is operable over an area covering a vehicle.

Different types of barriers and operators may also be used in the system. For example, the moveable barrier operator may be a gate operator or a garage door operator. In another example, the barrier may be a garage door, a sliding gate, a swinging gate, a swinging door, or shutters.

Thus, approaches are provided whereby a barrier operator intercepts high-quality speech communications and processes these communications in order to actuate a barrier. These approaches require little or no modifications to existing networks and equipment and allow barriers to be actuated as intended by users.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Figure 1:
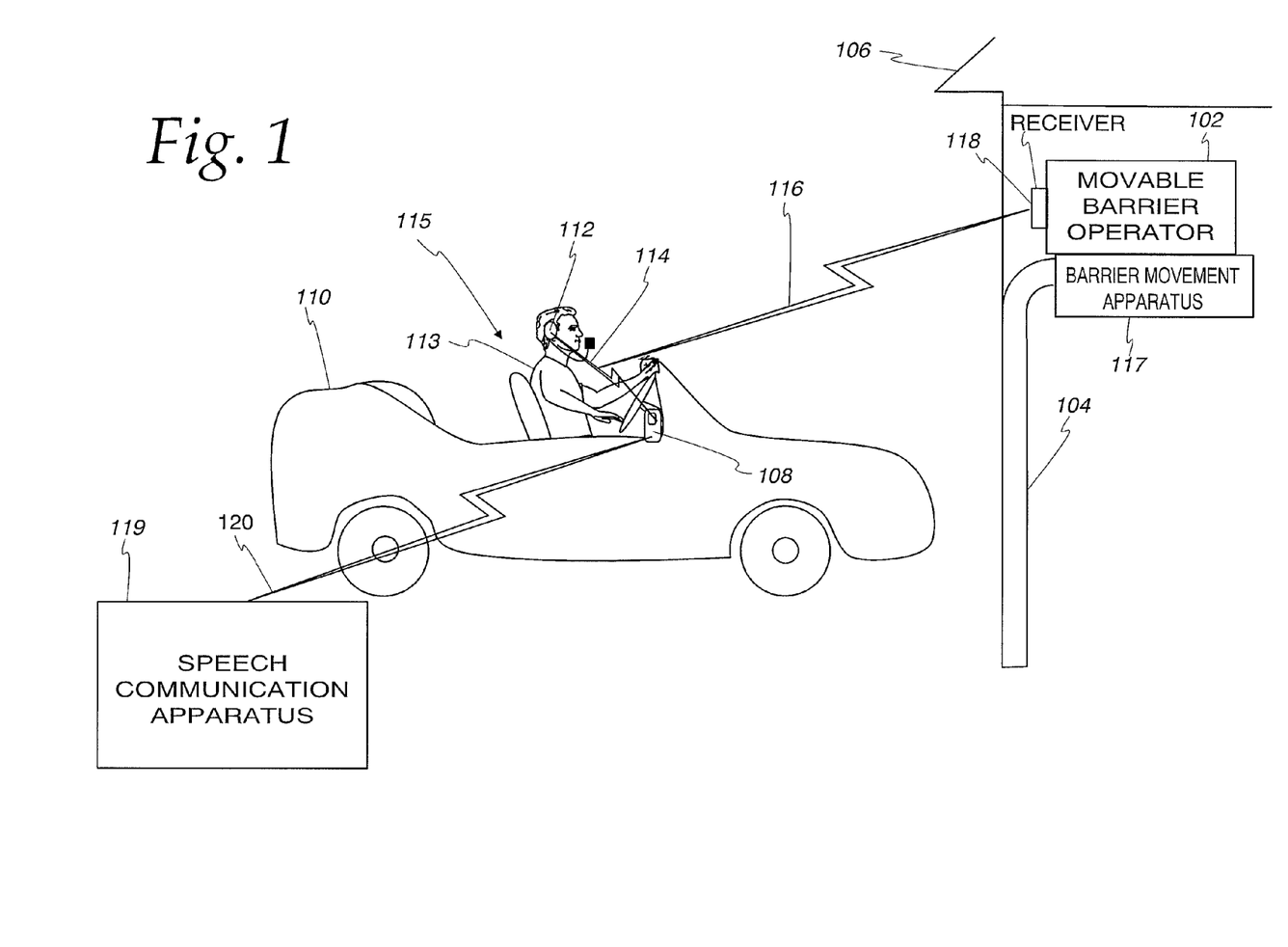
FIG. 1 is a diagram of a wireless system for actuating a barrier according to the present invention.

Referring now to the drawings and especially to FIG. 1, one example of a wireless system for actuating a barrier is described. A movable barrier operator 102 is housed in a garage 106 and is used to move a barrier 104. In this example, the moveable barrier operator 102 is a garage door operator and the barrier 104 is a garage door. However, it will be understood that the barrier operator 102 may be any type of operator such as a swinging gate operator or sliding gate operator and that the barrier may be any type of barrier such as a swinging gate or a sliding gate. It should also be understood that receiver and speech recognition functionality can be physically part of the operator or positioned in an independent add-on appliance taking into account, for example, the needs and requirements of the marketplace. Other examples of moveable barrier operators and barriers are possible. A barrier movement apparatus 117 is controlled by the barrier operator 10 and may include motors, springs, pulleys, or any other mechanism needed to move the barrier 104.

A user 113 is positioned in a vehicle 110. Although this example shows that the user 113 is within the vehicle 110, it will be appreciated that the user may be outside the vehicle and/or that no vehicle may exist.

The user 113 orally communicates speech to a wireless speech transmission device 112, which in this case is a wireless headset of the type used to communicate with cellular phones. Other types of wireless speech transmission devices may also be used. The wireless speech transmission device communicates speech representing data over a link 114 to a wireless speech communication device 108 using a first communication protocol. The wireless speech communication device 108 may be any type of wireless device such as a cellular telephone, personal digital assistant, pager, or personal computer. In this example, the wireless speech communication device 108 is a cellular phone. The first communication protocol may be any type of high-quality speech transmission protocol such as Bluetooth.

The wireless speech communication device 108 receives the speech representing data from the wireless speech transmission device 112 and couples a representation of this data to a speech representing apparatus 119 using a second communication protocol over a communication link 120. The second communication protocol may be a wired or wireless protocol. The speech communication apparatus 119 may be any type of network or device such as a cellular network or a device within another network such as a base station within a cellular network.

The wireless speech communication device 108 and the wireless speech transmission device 108 operate within a wireless low-power personal area network 115. The network 115 has a limited geographic operating area or range such as within a vehicle or within a narrow distance of a user. In one example, the network 115 may be a pico-network. The network 115 operates using low power and achieves high-quality transmission of speech representing data, for example, by using a protocol such as Bluetooth or similar protocols.

In one example of the operation of the system of FIG. 1, the wireless speech transmission device 112 communicates a wireless transmission of speech representing data over the link 114 in a first protocol via the wireless low-power personal area network 115. The speech representing data conveys substantially noise-free human speech.

The wireless speech communication device 108 receives the speech representing data over the link 114 in the first protocol via the wireless low-power personal area network 115 and couples representations of the speech representing data over the link 120 to the speech communication apparatus 119 according to a second protocol. For example, if the wireless speech communication device 108 is a cellular phone, the cellular phone may convert the speech representing data to another form and transmit the speech representing data to a cellular network according to a cellular network protocol. The wireless speech communication device could also be a personal computer or personal digital assistant and be responsive to voice commands and/or convert voice information into text. For example, a personal computer may receive speech from the user 113 and have an associated speech-to-text conversion program that converts the received speech into text that can be stored at the personal computer.

The moveable barrier operator 102 is within the receiving range of the wireless transmission of the speech representing data from the wireless speech transmission device 114 and intercepts the wireless transmission (shown via an arrow 116) from the wireless speech transmission device 112 at the receiver 118. The moveable barrier operator 118 recognizes a speech pattern from the speech representing data in the wireless transmission over the link 114. The speech pattern may be a word or phrase having significance for actuating the barrier 104. For example, the word or phrase may be "open the door", "open", "close the door", "close", or "stop." Other examples of words or phrases are possible. The barrier operator 102 may also verify the identity of the user speaking to ensure that only authorized users can actuate the barrier 104. In this regard, the barrier operator 102 may utilize any speech recognition technique or algorithm. The barrier movement apparatus 117 actuates the barrier 104 based upon the speech pattern.

In another example of the operation of the system of FIG. 1, the barrier operator 102 may operate in a learn mode. In this case, the allowable words or phrases that are to be recognized by the operator 102 may be learned by the operator 102. For instance, a button or switch may exist at the operator 102 and when the button or switch is actuated, the user may speak words or phrases into the speech transmission device 112, which are intercepted by the barrier operator 102, processed, and stored as recognizable/acceptable words or phrases that can be used to actuate the barrier 104.

In still another example of the operation of the system of FIG. 1, the operator 102 may operate in either a speaker independent mode or a speaker dependent mode. In the speaker independent mode, the operator 102 examines received speech transmissions for words or phrases regardless of the speaker. Various speech recognition algorithms can be used for this purpose. On the other hand, in speaker dependent mode, the system determines the identity of a speaker, and then the speech pattern. Specifically, the operator 102 may contain speaker recognition software that matches received speech from known instances of a speakers speech to determine if the speaker is an authorized user. If the speaker is an authorized user, the operator 102 may examine the speech as in a speaker independent mode of operation to determine the words or phrases in the received transmission and move the barrier 104 accordingly.

Figure 2:
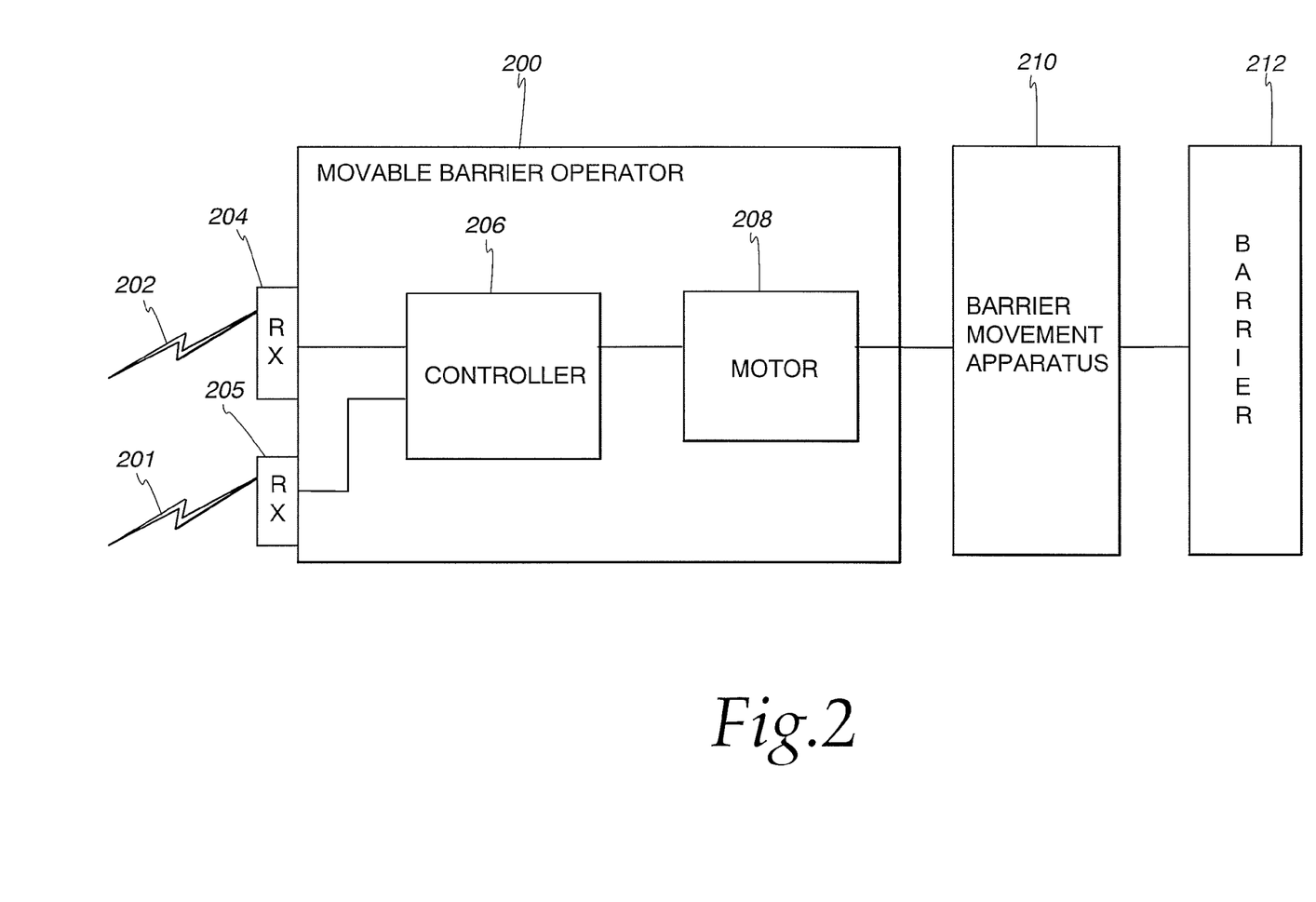
FIG. 2 is a block diagram of a barrier operator for actuating a barrier according to the present invention.

Referring now to FIG. 2, one example of a barrier operator for wirelessly actuating a barrier is described. A moveable barrier operator 200 includes a controller 206, a first receiver 204, a second receiver 205, and a motor 208. The motor 208 drives a barrier movement apparatus 210, which, in turn moves a barrier 212. Alternatively, the motor 208 may be removed from the barrier operator, but still drives the barrier movement apparatus 210. The barrier movement apparatus 210 may be any type of apparatus (e.g., pulleys, chains, springs) that moves the barrier 212. The barrier 212 may be any type of barrier such as a garage door, sliding gate, swinging gate, or shutters. Other examples of barriers are possible.

The first receiver 204 intercepts wireless transmissions 202 made from a wireless speech transmission device 112, for example, from a telephone headset. The transmissions 202 are made according to a high-quality wireless protocol such as Bluetooth. The second receiver 205 receives transmissions 201 from a portable transmitter such as a garage door transmitter. The transmissions 201 are used to actuate (e.g., open, close, or halt movement) of the barrier 212.

In one example of the operation of the operator of FIG. 2, the wireless transmissions 202 including data representing speech are intercepted by the receiver 204 of the moveable barrier operator 200. The receiver 204 may also include circuitry for converting the transmissions from a wireless form to a form (e.g., digital) usable by the barrier operator 200. The controller 206 receives the converted transmissions and may determine if the speaker of the transmissions is an authorized user. If an authorized user, the controller 206 may then determine speech patterns (e.g., words or phrases) in the transmissions and actuate the motor 208 to drive the barrier movement apparatus to move the barrier 212 according to the speech patterns.

Figure 3:
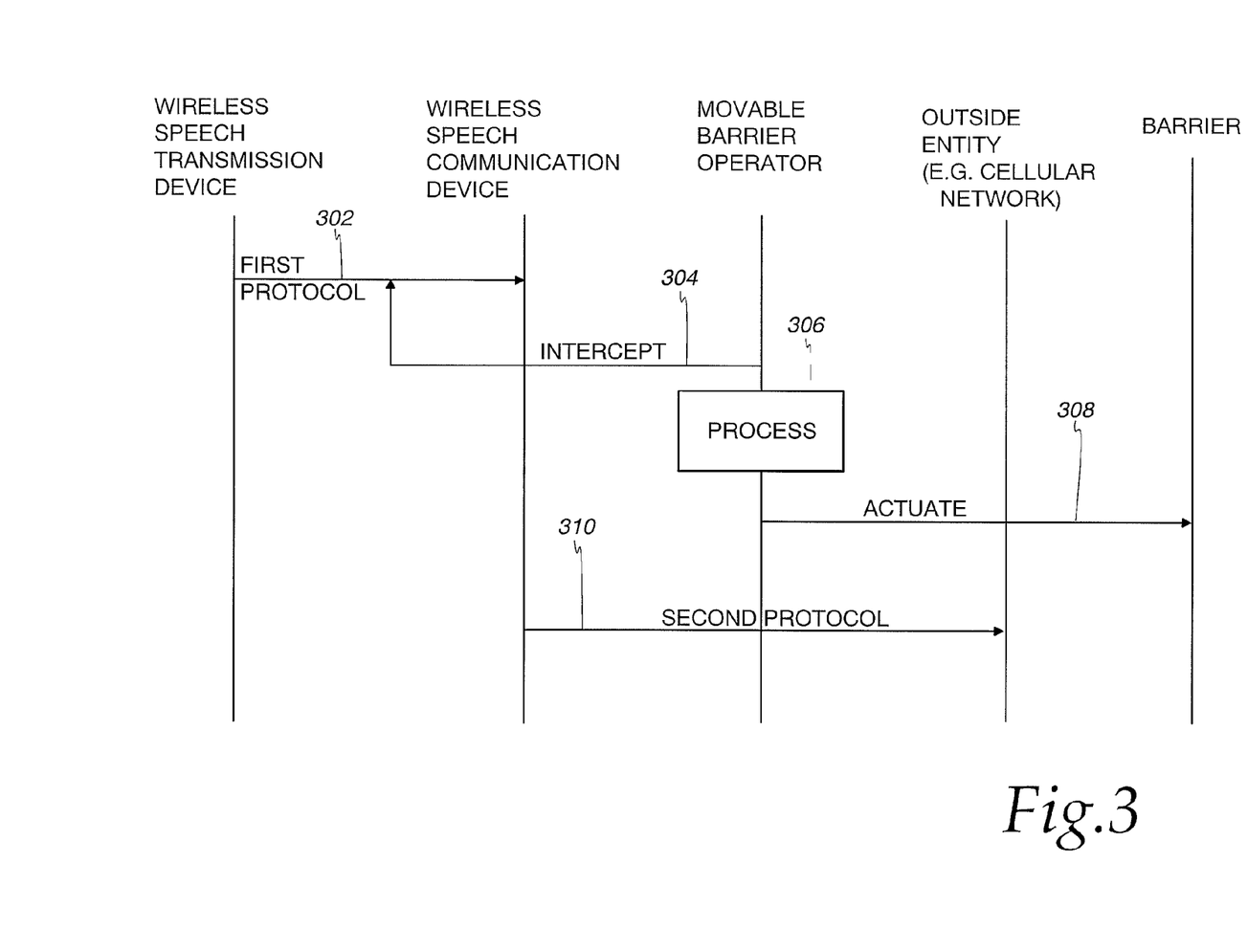
FIG. 3 is a diagram showing communications in a wireless system for actuating a barrier according to the present invention.

Referring now to FIG. 3, one example of communications conducted in a wireless system for actuating a barrier is described. The devices described in connection with FIG. 3 operate in a wireless low-power personal area network such as a pico-network. At step 302, a wireless transmission including speech representing data is transmitted from a wireless speech transmission device (e.g., a wireless headset) to a wireless speech communication device (e.g., a cellular phone) according to a first protocol. The first protocol is a wireless protocol such as a Bluetooth-compliant protocol. At step 304, a moveable barrier operator intercepts the communication 302. At step 306, the communication is processed. For example, the moveable barrier operator may determine if the speaker of the communication is an authorized user. In another example, the moveable barrier operator may determine a word or phrase in the communication.

At step 308, the moveable barrier operator actuates a barrier based upon the contents of the received communication. For example, if the word "open" were received and recognized, step 308 would be used to open the barrier. At step 310 representations of the data representing speech in the communication are sent to an outside entity (e.g., a cellular network) via a second protocol. The second protocol may be a wireless or wired protocol depending, for example, upon the type of the wireless speech communication device. For example, different second protocols may be used depending upon whether the wireless speech communication device is a cellular phone or a personal computer.

Figure 4:
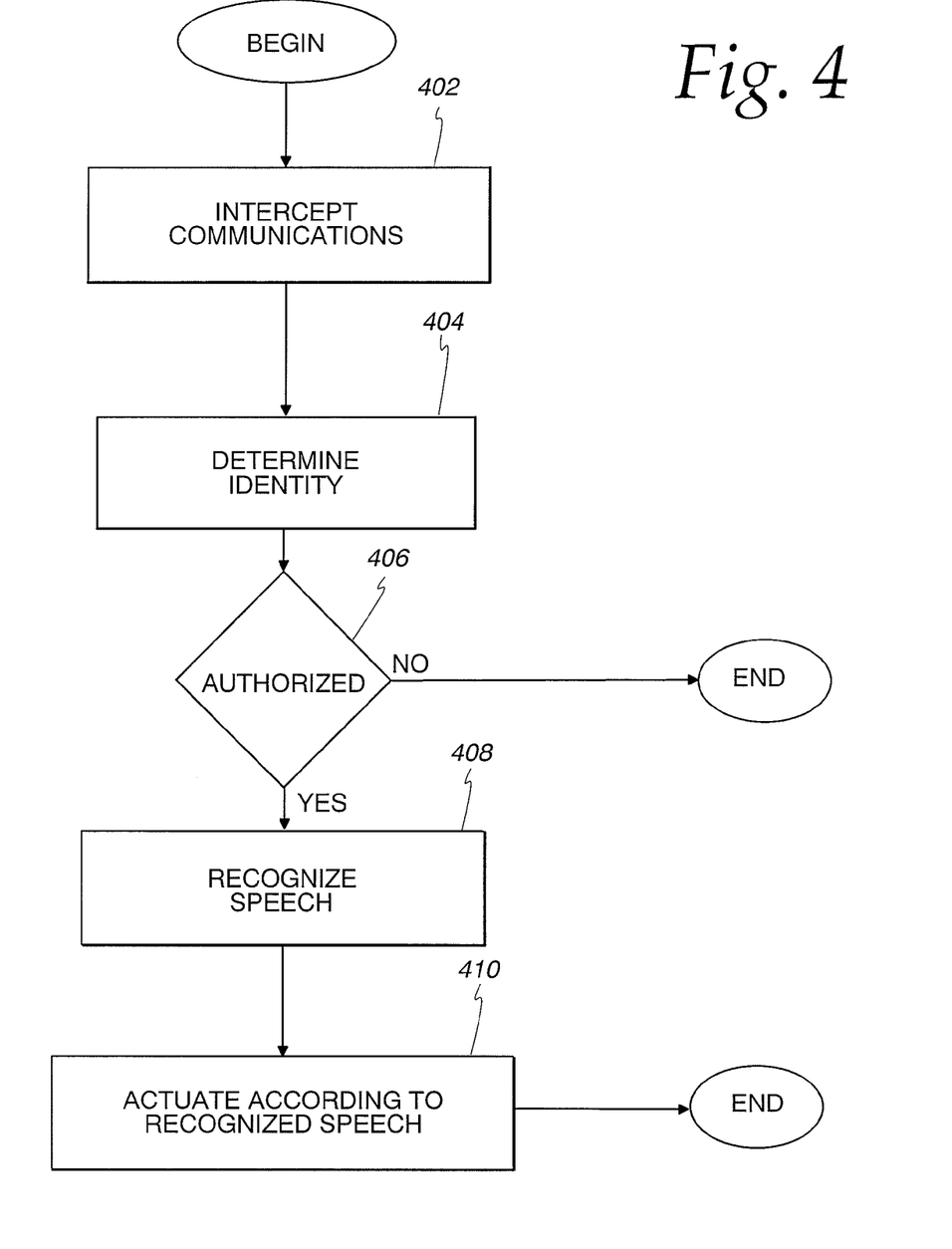
FIG. 4 is a flowchart of one approach for wirelessly actuating a barrier according to the present invention.

Referring now to FIG. 4, one example of an approach for wirelessly actuating a barrier is described. At step 402, communications are intercepted by a moveable barrier operator. At step 404, the operator determines the identity of the speaker of the communications. At step 406, the system determines if the speaker is an authorized user. If the answer is negative at step 406, then execution ends and the user is not permitted to actuate the barrier.

If the answer at step 406 is affirmative, then at step 408, the system determines the contents of the speech. For example, the system applies speech recognition algorithms to the received speech to detect a speech pattern. The speech pattern may be, for instance, a word or phrase such as "open" or "close." After the speech is recognized, at step 410, the barrier is actuated according to the word or phrase. A mapping relationship stored in a memory at the moveable barrier operator may indicate a relationship between received words/phrases and actions and may be used for this purpose. For instance, the system may be configured so that when "open" is received, the barrier may be opened. In another example, when the word "close" is received, the barrier may be closed. Other examples of received speech and corresponding actuations are possible.

Thus, approaches are provided whereby a barrier operator intercepts high-quality speech communications and processes these communications in order to actuate a barrier. These approaches require little or no modifications to existing networks or equipment and allow barriers to be actuated as intended by users.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A system comprising:
a mobile wireless speech transmission device operable in a moving vehicle, the mobile wireless speech transmission device communicating a wireless transmission signal representing speech data in a first protocol via a wireless low-power personal area network, the speech data representative of substantially noise-free human speech;
a mobile wireless speech communication device receiving the wireless transmission signal representing the speech data in the first protocol via the wireless low-power personal area network and coupling the speech data to a speech communication apparatus in a second protocol;
a moveable barrier operator separate from the mobile wireless speech communication device, the moveable barrier operator comprising a receiver configured to directly intercept the same wireless transmission signal from the mobile wireless speech transmission device received by the mobile wireless speech transmission device in the first protocol, the moveable barrier configured to recognize a speech pattern from the speech data in the wireless transmission signal representing speech data in the first protocol; and
a barrier movement apparatus coupled to a barrier and the moveable barrier operator for actuating the barrier based upon the speech pattern.

2. The system of claim 1 wherein the moveable barrier operator is configured to identify a word or phrase in the wireless transmission.

3. The system of claim 1 wherein the first protocol is a wireless protocol.

4. The system of claim 3 wherein the wireless protocol is the Bluetooth-compliant protocol.

5. The system of claim 1 wherein the second protocol is a cellular protocol.

6. The system of claim 1 wherein the wireless speech communication device comprises a cellular phone.

7. The system of claim 1 wherein the wireless speech communication device comprises a device selected from a group comprising a personal digital assistant, a pager, and a personal computer.

8. The system of claim 1 wherein the personal area network is operable over an area covering a vehicle.

9. The system of claim 1 wherein the mobile wireless transmission device comprises a wireless headset.

10. The system of claim 1 wherein the moveable barrier operator is selected from a group comprising a gate operator and a garage door operator.

11. A method comprising:
operating a mobile wireless speech communication device and a mobile wireless speech transmission device operable in a moving vehicle within a wireless low power personal area network;
transmitting a wireless transmission over a substantially noise-free wireless link from the mobile wireless transmission device to the mobile wireless speech communication device according to a first protocol, the wireless transmission including a wireless signal representative of speech data;

receiving the wireless signal representative of the speech data from the mobile wireless transmission device at the mobile wireless communication device to establish a wireless communication link in the first protocol;

at a time when the wireless communication link is established between the mobile wireless transmission device and the mobile wireless communication device, directly intercepting the wireless signal representative of speech at a receiver of a moveable barrier operator separate from the mobile wireless speech communication device;

processing the wireless transmission at the moveable barrier operator to determine a speech pattern of the speech representing data in the wireless transmission; and actuating a barrier according to the speech pattern.

12. The method of claim 11 wherein the speech pattern comprises a word or phrase.

13. The method of claim 11 wherein the first protocol is a wireless protocol.

14. The method of claim 13 wherein the first protocol is the Bluetooth-compliant protocol.

15. The method of claim 11 wherein the second protocol is a cellular protocol.

16. The method of claim 11 wherein the wireless speech communication device comprises a cellular phone.

17. The method of claim 11 wherein the wireless speech communication device is selected from a group comprising: a personal digital assistant, a pager, and a personal computer.

18. The method of claim 11 wherein the personal area network operates within a vehicle.

19. The method of claim 11 wherein the mobile wireless transmission device comprises a wireless headset.

20. A system comprising:
a mobile wireless speech transmission device operable in a moving vehicle, the mobile wireless speech transmission device being adapted to convert received human speech into a high-quality wireless transmission signal, the high quality wireless transmission signal representative of speech data, the mobile wireless speech transmission device sending the wireless transmission signal to a cellular phone according to a first wireless protocol with an established first communication link between the mobile wireless speech transmission device and the cellular phone; and
a moveable barrier operator being adapted to intercept the same wireless transmission signal sent to the cellular phone according to the first wireless protocol with the established first communication link, recognize a speech pattern in the speech data, and operate a moveable barrier according to the speech pattern.

21. The system of claim 20 wherein the moveable barrier operator is configured to identify a word or phrase in the wireless transmission.

22. The system of claim 20 wherein the wireless protocol is the Bluetooth-compliant protocol.

23. The system of claim 20 wherein the mobile wireless transmission device, barrier operator, and cellular phone operate over personal area network.

24. The system of claim 23 wherein the personal area network is operable over an area covering a vehicle.

25. The system of claim 20 wherein the mobile wireless transmission device comprises a wireless headset.

26. The system of claim 20 wherein the moveable barrier operator is selected from a group comprising a gate operator and a garage door operator.

27. The system of claim 20 wherein the cellular phone is configured to couple a representation of the speech data transmitted in the first protocol to a speech communications apparatus in a second cell phone protocol at about a time when the wireless transmission signal is intercepted by the moveable barrier operator.

28. A method comprising:
operating a mobile bluetooth compliant transmission device and a mobile phone within a wireless low power personal area network;
transmitting a wireless transmission signal from the mobile bluetooth compliant transmission device to the mobile phone according to a bluetooth compliant protocol, the wireless transmission signal representative of speech data;
receiving the wireless transmission signal representative of the speech data from the bluetooth compliant transmission device at the mobile phone according to an established first wireless communication link;
directly intercepting the wireless transmission signal representative of speech data transmitted according to the bluetooth compliant protocol and the established first wireless communication link at a receiver of a moveable barrier operator separate from the mobile wireless speech communication device; and
processing the wireless transmission signal at the moveable barrier operator to determine a speech pattern of the speech data in the wireless transmission; and
actuating a barrier according to the speech pattern.

29. The method of claim 28 wherein the method further comprises coupling the speech data transmitted in the bluetooth compliant protocol from the mobile phone to a speech communication apparatus in a cell phone protocol at about a time the wireless transmission signal is intercepted by the moveable barrier operator.

* * * * *

UNITED STATES PATENT AND TRADEMARK OFFICE
CERTIFICATE OF CORRECTION

| | |
|---|---|
| PATENT NO. | : 8,175,591 B2 |
| APPLICATION NO. | : 11/566532 |
| DATED | : May 8, 2012 |
| INVENTOR(S) | : James J. Fitzgibbon |

It is certified that error appears in the above-identified patent and that said Letters Patent is hereby corrected as shown below:

TITLE PAGE:

Line (73) Assignee: Change "The Chamerlain Group, Inc." to -- The Chamberlain Group, Inc. --.

Signed and Sealed this
Second Day of October, 2012

David J. Kappos
*Director of the United States Patent and Trademark Office*